(12) United States Patent
Radon et al.

(10) Patent No.: US 9,284,631 B2
(45) Date of Patent: Mar. 15, 2016

(54) HYPEREUTECTIC WHITE IRON ALLOYS COMPRISING CHROMIUM AND NITROGEN AND ARTICLES MADE THEREFROM

(71) Applicants: Roman Radon, Belleview, FL (US);
Raphael Radon, Alexandria, VA (US)

(72) Inventors: Roman Radon, Belleview, FL (US);
Raphael Radon, Alexandria, VA (US)

( * ) Notice: Subject to any disclaimer, the term of this patent is extended or adjusted under 35 U.S.C. 154(b) by 0 days.

(21) Appl. No.: 14/279,600

(22) Filed: May 16, 2014

(65) Prior Publication Data

US 2015/0329944 A1 Nov. 19, 2015

(51) Int. Cl.
*C22C 38/58* (2006.01)
*C22C 37/10* (2006.01)
*C22C 37/08* (2006.01)

(52) U.S. Cl.
CPC .................. *C22C 37/10* (2013.01); *C22C 37/08* (2013.01)

(58) Field of Classification Search
CPC .............................. C22C 37/06; B22F 2999/00
USPC .......................................... 420/11, 15, 16, 17
See application file for complete search history.

(56) References Cited

U.S. PATENT DOCUMENTS

| 2,353,688 | A | * | 7/1944 | Burgess | .................. 148/605 |
| 3,834,950 | A | * | 9/1974 | Feltz | ..................... 148/327 |
| 5,252,149 | A | | 10/1993 | Dolman | |
| 5,803,152 | A | | 9/1998 | Dolman et al. | |
| 5,936,169 | A | * | 8/1999 | Pinnow et al. | .................. 75/246 |
| 6,761,777 | B1 | | 7/2004 | Radon | |
| 2012/0160363 | A1 | | 6/2012 | Jin et al. | |
| 2013/0084462 | A1 | * | 4/2013 | Theisen et al. | ................ 428/544 |

FOREIGN PATENT DOCUMENTS

| CN | 101497966 A | | 8/2009 |
| CN | 102251185 A | | 11/2011 |
| GB | 2153846 A | * | 8/1985 |
| WO | 8404760 A1 | | 12/1984 |

\* cited by examiner

*Primary Examiner* — Jie Yang
(74) *Attorney, Agent, or Firm* — Abel Law Group, LLP

(57) ABSTRACT

Disclosed are a hypereutectic white iron alloy and articles such as pump components made therefrom. Besides iron and unavoidable impurities the alloy comprises, in weight percent based on the total weight of the alloy, from 2.5 to 6.5 C, from 0.04 to 1.2 N and from 18 to 58 Cr and, optionally, one or more of Mn, Ni, Co, Cu, Mo, W, V, Mg, Ca, Si, rare earth elements, Nb, Ta, Ti, Zr, Hf, Al, B.

25 Claims, 1 Drawing Sheet

CM22  T60  T70

HYPEREUTECTIC WHITE IRON ALLOYS COMPRISING CHROMIUM AND NITROGEN AND ARTICLES MADE THEREFROM

BACKGROUND OF THE INVENTION

1. Field of the Invention

The present invention relates to a hypereutectic white iron alloy that comprises chromium and nitrogen, as well as to articles such as pump components made therefrom (e.g., by sand casting).

2. Discussion of Background Information

High chromium white iron alloys find use as abrasion resistant materials for the manufacture of, for example, casings of industrial pumps, in particular pumps which come into contact with abrasive slurries of minerals. This alloy material has exceptional wear resistance and good toughness with its hypoeutectic and eutectic compositions. For example, high chromium white iron in accordance with the ASTM A532 Class III Type A contains from 23% to 30 wt. % of chromium and about 3.0% to 3.3 wt. % of carbon. However, in severely abrasive applications the wear resistance of these high chromium white iron alloys is not satisfactory due to a lack of a sufficient "Carbide Volume Fraction" (CVF). It is well known that increasing the content of both Cr and C can considerably improve the wear resistance of high chromium white iron alloys under severely abrasive conditions. For example, hypereutectic Fe—Cr—C alloys for hardfacing typically contain 4.5% C and 24% Cr. The amount of carbides and in particular, the CVF can be estimated from the following experimentally developed equation: CVF=12.33×% C+0.55× (% Cr+% M)−15.2% (M representing one or more carbide forming elements in addition to chromium, if any). For the above hardfacing alloy, CVF=(12.33×4.5%)+(0.55×24%)−15.2%=53.5%.

Hardfacing has the benefit of making an article wear resistant by cladding, i.e., by depositing a layer of an alloy of wear resistant composition thereon. However, hardfacing methods have disadvantages, including a limited thickness of the cladding, distortion of the article to be cladded, and high costs of labor, cladding material and equipment. Moreover, the cladding usually is susceptible to developing defects such as spalling and cracking due to thermal stresses and contraction, and it shows constraints with respect to thermal hardening.

Further, making (slurry) pump components such as pump casings by common foundry methods from hypereutectic high chromium white iron alloys is virtually impossible due to high scrap and rejection rates. Pump casings are large and heavy and are not uniform in thickness. For example, cross-sections in some areas of a pump casing may be up to 10 inch and the wall thickness in at least some parts thereof may be 1 inch or even higher. In view thereof, it is virtually impossible for a casting to cool uniformly in a sand mold, which results in stress induced cracking during cooling.

In particular, during solidification in a sand mold, hypereutectic high chromium cast iron forms a primary phase by nucleation and growth processes. Large primary chromium carbides, up to several hundreds microns in length, crystallize in the thick sections of the casting where the cooling is slower than in the remainder of the casting. These large primary carbides lower the fracture toughness of a casting, wherefore the casting usually cracks during the manufacturing process or later during application in the work field.

For the foregoing reasons, hypereutectic high chromium white cast iron alloys have in the past not been suitable for the sand casting of large parts and there have been various attempts to address this problem.

The background section of WO 84/04760, the entire disclosure of which is incorporated by reference herein, which primarily relates to high chromium white cast iron alloys of both hypoeutectic and hypereutectic compositions, describes the many failed attempts to develop satisfactory hypereutectic white iron alloys for castings, which combine wear resistance with fracture toughness. This document also describes various attempts to develop hypoeutectic compositions, and draws on attempts in the art to develop suitable hardfacing alloys as providing possible solutions to the wear resistance vs fracture toughness dilemma. However, according to WO 84/04760 the cracking problem of cast compositions is in fact predominantly solved by forming them as cast composites—namely by creating a composite component comprising the preferred alloy metallurgically bonded to a substrate, thus assisting with avoiding the likelihood of cracking upon cooling of the cast alloy. WO 84/04760 seeks to overcome the disadvantages of low fracture toughness and cracking with hypereutectic castings having greater than 4.0 wt, % carbon by ensuring the formation in a composite casting of primary $M_7C_3$ carbides with mean cross-sectional dimensions no greater than 75 µm, and suggests a variety of mechanisms for doing so. Thus, WO 84/04760 aims to overcome the problem by forming composite components and limiting the size of the primary $M_7C_3$ carbides in the alloy itself.

U.S. Pat. No. 5,803,152, the entire disclosure of which is incorporated by reference herein, also seeks to refine the microstructure of in particular, thick section hypereutectic white iron castings, in order to maximize the nucleation of primary carbides, thereby enabling an increase not only in fracture toughness but also in wear resistance. This refinement is achieved by introducing a particulate material into a stream of molten metal as the metal is being poured for a casting operation. The particulate material is to extract heat from, and to undercool, the molten metal into the primary phase solidification range between the liquidus and solidus temperatures. This method has the limitation of a difficult to achieve even distribution of the additive, a particulate material, into a stream of molten metal as the metal is being poured for a casting operation. The particulate material consists mainly of chromium carbides which contain about 10% C and 90% Cr and is added to the stream of molten metal in amounts of up to 10%. This addition of carbides increases the carbon and chromium concentrations in the already hypereutectic base alloy iron and causes a shift and extension of the interval between liquidus temperature and solidus temperature.

Substituting nitrogen for carbon is known for the production of High Strength Low Alloy Steels (HSLAS). The HSLAS comprise about 0.15% C, 0.03% N and 0.15% V. In this case it was shown that for every added 0.01% of C the strength increases by 5.5 MPa after thermo-mechanical processing, while for every added 0.001% of N the corresponding increase is 6 MPa. It was found that vanadium and nitrogen first form pure VN nuclei, which subsequently grow at the expense of solute nitrogen. When nitrogen is exhausted, the solute carbon precipitates and progressively transforms the nitrides into carbonitrides $V(C_yN_{1-y})$ instead of into precipitates of VC. These carbonitrides are of submicron size and crystallize in the face-centered cubic NaCl type crystal structure.

Another advantage of the substitution of nitrogen for carbon in iron alloys is described in U.S. Pat. No. 6,761,777, the entire disclosure of which is incorporated by reference herein. This patent discloses alloys containing from 0.01% to 0.7% of N and showing improved mechanical properties, in particular corrosion and wear resistance, due to nitrogen giving rise to the formation of carbonitride precipitates and solid solution strengthening.

Further, titanium nitride is produced intentionally within some steels by addition of titanium to an alloy. TiN forms at very high temperatures and nucleates directly from the melt in secondary steelmaking Titanium nitride has the lowest solubility product of any metal nitride or carbide in austenite, a useful attribute in microalloyed steel formulas.

SUMMARY OF THE INVENTION

The present invention provides a hypereutectic high chromium white iron alloy. The alloy comprises, in weight percent based on the total weight of the alloy, from 2.5 to 6.5 carbon, from 0.04 to 1.2 nitrogen, and from 18 to 58 chromium. The alloy may optionally comprise one or more additional elements, especially manganese (up to 8), nickel (up to 5), cobalt (up to 5), copper (up to 5), molybdenum (up to 5), tungsten (up to 6), vanadium (up to 12), niobium (up to 6), titanium (up to 5), magnesium and/or calcium (total up to 0.2), silicon (up to 3), one or more rare earth elements, i.e., one or more of Sc, Y, La, Ce, Pr, Nd, Pm, Sm, Eu, Gd, Tb, Dy, Ho, Er, Tm, Yb, Lu (total up to 3), and one or more of tantalum, zirconium, hafnium, aluminum, boron (total up to 3). The remainder of the alloy usually is constituted by iron and unavoidable impurities.

In one aspect, the alloy of the present invention may comprise one or more of the above elements in one or more (e.g., two, three, four, five, six, seven, eight, nine, ten, eleven, twelve, or all) of the following weight percentages: from 3 to 6 C, from 0.12 to 1.1 N, from 23 to 48 Cr, from 0.1 to 5 Mn, from 0.3 to 3 Ni, from 0.2 to 2.5 Cu, from 0.5 to 5 Mo, in particular from 0.5 to 4.5 Mo, from 0 to 5.5 W, from 2 to 9 V, from 0.01 to 0.15 Mg and/or Ca, from 0.1 to 2 Si, from 0.05 to 2 of one or more rare earth elements, from 0.001 to 6 of one or more of Nb, Ta, Ti, Zr, Hf, Al, B.

In another aspect, the alloy may comprise one or more of the above elements in one or more (e.g., two, three, four, five, six, seven, eight, nine, ten, eleven, twelve, or all) of the following weight percentages: from 3.5 to 6 C, from 0.3 to 1 N, from 25 to 45 Cr, from 0.8 to 4.8 Mn, from 0.5 to 2 Ni, from 0.4 to 2 Cu, from 0.8 to 4 Mo, from 0 to 5 W, from 3 to 8 V, from 0.02 to 0.1 Mg and/or Ca, from 0.2 to 1.2 Si, from 0.08 to 1 of one or more rare earth elements, from 0.01 to 2.5 of one or more of Nb, Ta, Ti, Zr, Hf, Al, B.

In yet another aspect, the alloy may comprise one or more of the above elements in one or more (e.g., two, three, four, five, six, seven, eight, nine, ten, eleven, or all) of the following weight percentages: from 4 to 6 C, from 0.5 to 0.9 N, from 26 to 43 Cr, from 0.9 to 3.5 Mn, from 0.5 to 1.5 Ni, from 0.45 to 2 Cu, from 1 to 3 Mo, from 0 to 4 W, from 4 to 7 V, from 0.02 to 0.08 Mg and/or Ca, from 0.3 to 1 Si, from 0.1 to 0.8 of one or more rare earth elements, from 0.01 to 2 of one or more of Nb, Ta, Ti, Zr, Hf, Al, B.

In a still further aspect, the alloy may comprise one or more of the above elements in one or more (e.g., two, three, four, five, six, seven, eight, nine, ten, eleven, or all) of the following weight percentages: from 4.5 to 5.9 C, from 0.6 to 0.78 N, from 27 to 42 Cr, from 1 to 3 Mn, from 0.6 to 1.2 Ni, from 0.5 to 2 Cu, from 1 to 3 Mo and/or W, from 4.5 to 6.5 V, from 0.02 to 0.08 Mg and/or Ca, from 0.3 to 1 Si, from 0.1 to 0.8 of one or more rare earth elements, from 0.01 to 1.5 of one or more of Nb, Ta, Ti, Zr, Hf, Al, B.

In another aspect, the alloy of the present invention may comprise one or more of the above elements in one or more (e.g., two, three, four, five, or all) of the following weight percentages: from 3 to 4 C, from 0.9 to 1.2 N, from 49 to 58 Cr, from 6 to 8 Mn, from 3 to 5 Ni, from 9 to 12 V.

In another aspect, the alloy of the present invention may comprise at least 40% by weight, e.g., at least 50% by weight of iron and/or may comprise (from 1.1 to 1.5)×(% C+% N) of vanadium, e.g., (from 1.1 to 1.3)×(% C+% N) of vanadium and/or may comprise from 0.05% to 2% of boron and/or may comprise from 0.01% to 0.8% of aluminum and/or may comprise from 0.01% to 1.5% of titanium.

In yet another aspect, the alloy of the present invention may comprise a carbonitride volume fraction (CNVF) of at least 50, e.g. at least 60, calculated as (% C+% N)×12.33+(% Cr+% M)×0.55−15.2%, wherein M represents the total percentage of one or more of V, Mo, Nb, and Ti (if present).

In a still further aspect, the alloy of the present invention may have been subjected to a hardening treatment, e.g., a cryogenic hardening treatment or a heat treatment (e.g., at a temperature in the range from 1,700° F. to 2,000° F.).

The present invention also provides an article which comprises or consists (or consists essentially) of the alloy of the present invention as set forth above (including the various aspects thereof). If the article merely comprises the alloy of the present invention, it may, for example, be present in the form of a cladding (e.g., for hardfacing). The thickness of the cladding can vary over a wide range and can, for example, be in the range of from 1 mm to 5 cm or even higher. The same applies to the thickness of a section of an article that is made from the alloy of the present invention.

In one aspect, the article of the present invention may have been cast from the alloy and/or may be a component (e.g., a casing) of a pump (e.g., of a slurry pump).

The present invention also provides a method of manufacturing the article of the present invention as set forth above. The method comprises casting the alloy in a sand mold.

The present invention also provides a method of making the alloy of the present invention as set forth above (including the various aspects thereof). The method comprises melting a mixture of two or more components which constitute a part of the alloy and adding to the resultant melt one or more metal nitrides and/or one or more metal carbonitrides which provide substantially all (e.g., at least 90 and in particular, at least 95%) of the nitrogen that is to be present in the alloy.

In one aspect of the method, the one or more metal nitrides may comprise an alloy that comprises Fe, N and Mn and/or Cr and/or may comprise V, N and C.

BRIEF DESCRIPTION OF THE DRAWINGS

The present invention is further described in the detailed description which follows, in reference to the drawings wherein.

DETAILED DESCRIPTION OF THE PRESENT INVENTION

Figure 1:
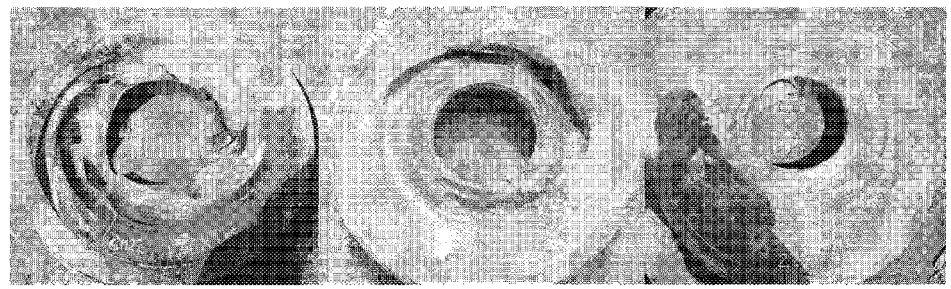
FIG. 1 shows photographs of three pump components made with the alloys described in Example 3 below.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

As used herein, the singular forms "a," "an," and "the" include the plural reference unless the context clearly dictates otherwise. For example, reference to "an alloy" would also mean that combinations of two or more alloys can be present unless specifically excluded.

Except where otherwise indicated, all numbers expressing quantities of ingredients, reaction conditions, etc. used in the instant specification and appended claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, each numerical parameter should be construed in light of the number of significant digits and ordinary rounding conventions.

Additionally, the disclosure of numerical ranges within this specification is considered to be a disclosure of all numerical values and ranges within that range. For example, if a range is from 1 to 50, it is deemed to include, for example, 1, 7, 34, 46.1, 23.7, or any other value or range within the range.

The various embodiments disclosed herein can be used separately and in various combinations unless specifically stated to the contrary.

The present invention provides a hypereutectic high chromium white iron alloy wherein a considerable portion of the carbon is replaced by nitrogen. This substitution of carbon by nitrogen beneficially causes a narrowing of the hypereutectic solidification temperature area and brings the solidification temperature closer to, or even renders it equal to, eutectic solidification temperatures, thereby narrowing the alloy liquidus temperature-solidus temperature interval. This causes a refinement of primary and eutectic phases of the cast high chromium alloy.

Without wishing to be bound by any theory, it is believed that the substitution of carbon by nitrogen causes a change of the morphology of the chromium carbides $M_7C_3$ (with M=Cr, V, Mo, W, etc.) into carbonitrides $M_7(C,N)_3$. These carbonitrides optimize the refinement in terms of size and homogeneous distribution in the cast microstructure. The nitrogen can be incorporated into the alloy by, for example, adding a nitrogen containing alloy to a melt of the other alloy components. Examples of corresponding nitrogen containing alloys include Fe—Cr-7% N, Fe—Mn—6% N, and 80% V-12% to 18% N ("Nitroven").

In addition to iron, the alloy of the present invention comprises three essential components, i.e., Cr, C and N. The weight percentage of Cr in the alloy is at least 18%, e.g., at least 20%, at least 22%, at least 23%, at least 24%, at least 25%, at least 26%, at least 27%, at least 28%, at least 29%, at least 30%, at least 31%, or at least 32%, but not higher than 58%, e.g., not higher than 55%, not higher than 52%, not higher than 48%, not higher than 45%, not higher than 44%, not higher than 43%, or not higher than 42%.

The weight percentage of C in the alloy of the present invention is at least 2.5%, e.g., at least 2.6%, at least 2.7%, at least 2.8%, at least 2.9%, at least 3.0%, at least 3.2%, at least 3.5%, at least 3.8%, at least 4.0%, at least 4.1%, at least 4.2%, at least 4.3%, at least 4.4%, or at least 4.5%, but not higher than 6.5%, e.g., not higher than 6.3%, not higher than 6.0%, or not higher than 5.9%.

The weight percentage of N in the alloy of the present invention is at least 0.04%, e.g., at least 0.06%, at least 0.08%, at least 0.1%, at least 0.12%, at least 0.15%, at least 0.18%, at least 0.2%, at least 0.25%, at least 0.3%, at least 0.4%, at least 0.5%, or at least 0.6%, but not higher than 1.2%, e.g., not higher than 1.1%, not higher than 1%, not higher than 0.9%, or not higher than 0.8%.

The alloy of the present invention usually comprises one or more additional elements, i.e., in addition to Fe, Cr, C and N. For example, often the alloy will also comprise at least one or more (and preferably all) of V, Mn, Ni, Mo, Cu and Si. However, other elements such as one or more of W, Co, Mg, Ca, Nb, Ta, Ti, Zr, Hf, Al, B, rare earth elements may (and often will) be present as well.

The alloy of the present invention usually comprises at least V as additional element. If employed, the weight percentage of V usually is at least 2%, e.g., at least 3%, at least 3.5%, at least 3.8%, at least 4%, at least 4.2%, or at least 4.5%, but usually not more than 12%, e.g., not more than 10%, not more than 8%, not more than 7.5%, or not more than 7%. Additionally, it is preferred for V to be present in weight percentages from 1.1 to 1.5 times (in particular from 1.1 to 1.4 times, or from 1.1 to 1.3 times) the combined weight percentage of C and N. As a general rule, the preferred concentration of V decreases with increasing concentration of Cr (while the preferred concentration of N increases with increasing concentration of Cr).

If employed, Mn is usually present in the alloy of the present invention in a weight percentage of at least 0.1%, e.g., at least 0.3%, at least 0.5%, at least 0.8%, at least 1%, or at least 1.1%, but usually not higher than 8%, e.g., not higher than 7%, not higher than 6%, not higher than 5%, not higher than 4%, or not higher than 3%.

If employed, Ni is usually present in the alloy of the present invention in a weight percentage of at least 0.2%, e.g., at least 0.3%, at least 0.4%, at least 0.5%, or at least 0.6%, but usually not higher than 5%, e.g., not higher than 4%, not higher than 3%, not higher than 2%, not higher than 1.5%, or not higher than 1.2%.

If employed, Co is usually present in the alloy of the present invention in a weight percentage of at least 0.1%, e.g., at least 0.15%, at least 0.2%, at least 0.25%, or at least 0.3%, but usually not higher than 4%, e.g., not higher than 3%, not higher than 2%, not higher than 1.5%, not higher than 1%, or not higher than 0.5%.

If employed, Cu is usually present in the alloy of the present invention in a weight percentage of at least 0.1%, e.g., at least 0.2%, at least 0.3%, at least 0.4%, at least 0.45%, or at least 0.5%, but usually not higher than 4.5%, e.g., not higher than 4%, not higher than 3%, not higher than 2%, not higher than 1.5%, or not higher than 1.2%.

If employed, Si is usually present in the alloy of the present invention in a weight percentage of at least 0.1%, e.g., at least 0.2%, at least 0.3%, at least 0.4%, at least 0.45%, or at least 0.5%, but usually not higher than 3%, e.g., not higher than 2.5%, not higher than 2%, not higher than 1.5%, or not higher than 1%.

If employed, Mo and/or W are usually present in the alloy of the present invention in a combined weight percentage of at least 0.3%, e.g., at least 0.5%, at least 0.6%, or at least 0.7%, but usually not higher than 6%, e.g., not higher than 5%, not higher than 4%, not higher than 3.5%, or not higher than 3%. If only one of Mo and W is to be present, preference is usually given to Mo, which in this case is usually present in weight percentages not higher than 5%, e.g., not higher than 4%, not higher than 3.5%, not higher than 3%, not higher than 2%.

If employed, Nb is usually present in the alloy of the present invention in a weight percentage of at least 0.1%, e.g., at least 0.2%, at least 0.3%, at least 0.4%, at least 0.5%, or at least 0.6%, but usually not higher than 5%, e.g., not higher than 4%, not higher than 3%, not higher than 2%, or not higher than 1%.

If employed, Ti is usually present in the alloy of the present invention in a weight percentage of at least 0.1%, e.g., at least 0.2%, at least 0.3%, at least 0.4%, at least 0.5%, or at least 0.6%, but usually not higher than 4%, e.g., not higher than 3%, not higher than 2%, not higher than 1.5%, or not higher than 1%.

If employed, Mg and/or Ca are usually present in the alloy of the present invention in a combined weight percentage of at least 0.01%, e.g., at least 0.02%, at least 0.03%, or at least 0.04%, but usually not higher than 0.2%, e.g., not higher than 0.18%, not higher than 0.15%, or not higher than 0.12%. Preferably, each of Mg and Ca is present in an individual weight percentage of at least 0.02% and not higher than 0.08%.

If employed, one or more rare earth elements are usually present in the alloy of the present invention in a combined weight percentage of at least 0.05%, e.g., at least 0.08%, at least 0.1%, or at least 0.15%, but usually not higher than 2%, e.g., not higher than 1%, not higher than 0.9%, or not higher than 0.8%.

If employed, one or more of Ta, Zr, Hf, Al, B are usually present in the alloy of the present invention in a combined weight percentage of at least 0.01%, e.g., at least 0.05%, at least 0.08%, or at least 0.1%, but usually not higher than 3%, e.g., not higher than 2.5%, not higher than 2%, or not higher than 1.5%. If B is present, the concentration thereof will usually be not lower than 0.05%, e.g., not lower than 0.08%, but usually not higher than 2%, e.g., not higher than 1%, not higher than 0.5%, not higher than 0.3%, or not higher than 0.1%. If Al is present, the concentration thereof will usually be not lower than 0.01%, e.g., not lower than 0.08%, but usually not higher than 0.8%, e.g., not higher than 0.6%, or not higher than 0.5%. Also, the combined weight percentage of Nb, Ti, Ta, Zr, Hf, Al, B, if one or more thereof are present at all, usually is at least 0.1, e.g., at least 0.2, at least 0.3, at least 0.4, or at least 0.5, but usually not higher than 4%, e.g., not higher than 3%, not higher than 2%, or not higher than 1.5%.

Among the unavoidable impurities which are usually present in the alloy of the present invention, sulfur and phosphorus may be mentioned. Their concentrations are preferably not higher than 0.2%, e.g., not higher than 0.1%, or not higher than 0.06% by weight each.

The alloy of the present invention is particularly suitable for the production of parts which are to have a high wear (abrasion) resistance and are suitably produced by a process such as sand casting. Non-limiting examples of such parts include slurry pump components, such as casings, impellers, suction liners, pipes, nozzles, agitators, valve blades. Other components which may suitably be made, at least in part, from the alloy of the present invention include, for example, shell liners and lifter bars in ball mills and autogenous grinding mills, and components of coal pulverizers.

Any conventional casting technology may be used to produce the alloy of the present invention. Additionally, the cast alloy may be heat-treated at a temperature in the range of, for example, from 1800 to 2000° F., followed by air cooling. The most preferred hardening method for the alloy of the present invention is by cryogenic treatment: cooling to a temperature of, for example, −100 to −300° F., and maintaining at this temperature for a time of, for example one hour per one inch of casting wall thickness. The cryogenic tempering process may be performed with equipment and machinery that is conventional in the thermal cycling treatment field. First, the articles-under-treatment are placed in a treatment chamber which is connected to a supply of cryogenic fluid, such as liquid nitrogen or a similar low temperature fluid. Exposure of the chamber to the influence of the cryogenic fluid lowers the temperature until the desired level is reached.

To sum up, the present invention provides:

1. A hypereutectic white iron alloy which comprises, in weight percent based on a total weight of the alloy:

| | |
|---|---|
| C | from 2.5 to 6.5 |
| N | from 0.04 to 1.2 |
| Cr | from 18 to 58 |
| Mn | from 0 to 8 |
| Ni | from 0 to 5 |
| Co | from 0 to 5 |
| Cu | from 0 to 5 |
| Mo | from 0 to 5 |
| W | from 0 to 6 |
| V | from 0 to 12 |
| Nb | from 0 to 6 |
| Ti | from 0 to 5 |
| (Mg + Ca) | from 0 to 0.2 |
| Si | from 0 to 3 |
| one or more rare earth elements | from 0 to 3 |
| one or more of Ta, Zr, Hf, Al, B | from 0 to 3. |

2. The alloy according to item 1., which comprises one of more elements in one or more of the following weight percentages:

| | |
|---|---|
| C | from 3 to 6 |
| N | from 0.12 to 1.1 |
| Cr | from 23 to 48 |
| Mn | from 0.1 to 5 |
| Ni | from 0.3 to 3 |
| Cu | from 0.2 to 2.5 |
| Mo | from 0.5 to 4.5 |
| W | from 0 to 5.5 |
| V | from 2 to 9 |
| (Mg + Ca) | from 0.01 to 0.15 |
| Si | from 0.1 to 2 |
| one or more rare earth elements | from 0.05 to 2 |
| one or more of Nb, Ta, Ti, Zr, Hf, Al, B | from 0.001 to 6. |

3. The alloy according to any one of items 1, and 2., which comprises one of more elements in one or more of the following weight percentages:

| | |
|---|---|
| C | from 3.5 to 6 |
| N | from 0.3 to 1 |
| Cr | from 25 to 45 |
| Mn | from 0.8 to 4.8 |
| Ni | from 0.5 to 2 |
| Cu | from 0.4 to 2 |
| Mo | from 0.8 to 4 |
| W | from 0 to 5 |
| V | from 3 to 8 |
| (Mg + Ca) | from 0.02 to 0.1 |
| Si | from 0.2 to 1.2 |
| one or more rare earth elements | from 0.08 to 1 |
| one or more of Nb, Ta, Ti, Zr, Hf, Al, B | from 0.01 to 3. |

4. The alloy according to any one of items 1. to 3., which comprises one of more elements in one or more of the following weight percentages:

| | |
|---|---|
| C | from 4 to 6 |
| N | from 0.5 to 0.9 |
| Cr | from 26 to 43 |
| Mn | from 0.9 to 3.5 |
| Ni | from 0.5 to 1.5 |
| Cu | from 0.45 to 2 |
| Mo | from 1 to 3 |
| W | from 0 to 4 |
| V | from 4 to 7 |
| (Mg + Ca) | from 0.02 to 0.08 |
| Si | from 0.3 to 1 |
| one or more rare earth elements | from 0.1 to 0.8 |
| one or more of Nb, Ta, Ti, Zr, Hf, Al, B | from 0.01 to 2. |

5. The alloy according to any one of items 1. to 4., which comprises one of more elements in one or more of the following weight percentages:

| | |
|---|---|
| C | from 4.5 to 5.9 |
| N | from 0.6 to 0.78 |
| Cr | from 27 to 42 |
| Mn | from 1 to 3 |
| Ni | from 0.6 to 1.2 |
| Cu | from 0.5 to 2 |
| (Mo + W) | from 1 to 3 |
| V | from 4.5 to 6.5 |
| (Mg + Ca) | from 0.02 to 0.08 |
| Si | from 0.3 to 1 |
| one or more rare earth elements | from 0.1 to 0.8 |
| one or more of Nb, Ta, Ti, Zr, Hf, Al, B | from 0.01 to 1.5. |

6. The alloy according to item 1., which comprises one of more elements in one or more of the following weight percentages:

| | |
|---|---|
| C | from 2.5 to 4 |
| N | from 0.9 to 1.2 |
| Cr | from 49 to 58 |
| Mn | from 6 to 8 |
| Ni | from 3 to 5 |
| V | from 9 to 12. |

7. The alloy according to any one of items 1. to 5., which comprises at least 40% by weight of iron.
8. The alloy according to any one of items 1. to 5., which comprises at least 50% by weight of iron.
9. The alloy according to items 1. to 8., which comprises (from 1.1 to 1.5)×(% C+% N) of vanadium.
10. The alloy according to any one of items 1. to 9., which comprises (from 1.1 to 1.3)×(% C+% N) of vanadium.
11. The alloy according to any one of items 1. to 10., which comprises from 0.05% to 2% of boron.
12. The alloy according to any one of items 1. to 11., which comprises from 0.01% to 0.8% of aluminum
13. The alloy according to any one of items 1. to 12., which comprises from 0.01% to 1.5% of titanium.
14. The alloy according to any one of items 1. to 13., wherein a carbonitride volume fraction (CNVF): (% C+% N)×12.33+(% Cr+% M)×0.55−15.2 equals at least 50, % M representing a total percentage of V, Mo, Nb, and Ti.
15. The alloy according to item 14., wherein CNVF equals at least 60.
16. The alloy according to any one of items 1. to 15., which has been subjected to a hardening treatment.
17. An article which comprises or consists or consists essentially of the alloy according to any one of items 1. to 16.
18. The article according to item 17., which has been cast from the alloy.
19. The article according to any one of items 17. and 18., which is a component of a pump.
20. A method of making the article according to any one of items 17. to 19., which method comprises casting the alloy in a sand mold.
21. A method of making the alloy according to any one of items 1. to 16., which method comprises melting a mixture of two or more components which constitute a part of the alloy and adding to a resultant melt one or more metal nitrides and/or one or more metal carbonitrides which provide substantially all of the nitrogen that is to be present in the alloy.
22. The method according to item 21., wherein the one or more metal nitrides comprise an alloy that comprises Fe, N, and one or both of Mn and Cr and/or comprise V, N and C.

EXAMPLES

Example 1

Comparative

An alloy of the following composition was used (in % by weight): C: 4.7, N: 0.03, Cr: 30, Mn: 2.4, Si: 0.45, S<0.06, P<0.06. The alloy was melted in a 30 kg high frequency induction furnace. The initial charge materials were steel scrap, ferroalloy and pig iron. The melt temperature was controlled at 2700° F. After all the charge materials had melted in the furnace, the liquidus temperature of the alloy was determined to be 2538° F. Then the molten alloy was poured at 2600° F. into sand molds with dimensions of 20 mm×20 mm×110 mm to obtain four samples for testing. The castings were cooled to ambient temperature in sand molds. As a result, three of the samples had developed cracks throughout their length of 110 mm. The fourth sample developed surface cracks during Brinell hardness testing.

The Brinell hardness of the samples was determined (10 mm tungsten ball and load of 3000 kg) to be 600 HB.

The Carbide Volume Fraction (CVF) of the samples can be calculated according to: CVF=% C×12.33+% Cr×0.55−15.2%=4.7%×12.33+30%×0.55−15.2%=59.25%.

Examination of the fractured faces of the samples revealed a very coarse fracture face (mean primary $M_7C_3$ carbide cross-sectional dimension of 200 μm or more).

Example 2

An alloy of the following composition was used (in % by weight): C: 4.4, N: 0.58, Cr: 31, Si: 0.45, Mn: 2.9, S<0.06, P<0.06. The alloy was melted in a 30 kg high frequency induction furnace. The initial charge materials were steel scrap, ferroalloy and pig iron. The melt temperature was controlled at 2780° F., whereafter the melt was nitrided by addition of Fe—Mn-8% N. After all the charge materials had melted in the furnace, the liquidus temperature of the alloy was determined to be 2481° F. Then the molten alloy was poured at 2544° F. into sand molds with dimensions of 20 mm×20 mm×110 mm to obtain four samples for testing. The castings were cooled to ambient temperature in sand molds. As a result, all four samples were free of cracks.

The Brinell hardness of the samples was determined (10 mm tungsten ball and load of 3000 kg) to be 683 HB.

The Carbonitride Volume Fraction (CNVF) of the samples can be calculated according to: CNVF=(% C+% N)×12.33+(% Cr+% M)×0.55−15.2=(4.4%+0.58%)×12.33+31%×0.55−15.2%=63.25%. (M=V, Mo, Nb, Ti)

The samples were treated with an abrasive blade and fractured. Examination of the fracture faces of the samples exhibited a very fine fracture face on all samples (mean primary $M_7(C,N)_3$ carbonitride cross-sectional dimension of 30 μm or less).

Example 3

Production on Industrial Scale

A production melt was made at 10,000 lbs. in an induction furnace, using 3 different alloys. The final alloy compositions were (in % by wt.):

| Element | C | Cr | Si | Mn | Ni | Mo | V | N | Cu | Fe |
|---|---|---|---|---|---|---|---|---|---|---|
| Eutectic alloy CM22 CNVF = 28% | 2.8 | 17.2 | 0.6 | 1.2 | 0.8 | 2.5 | 4.4 | 0.03 | 0.6 | Bal. |
| Hypereutectic alloy T 60 CNVF = 52% | 4.1 | 18.2 | 0.5 | 1.8 | 0.6 | 4.0 | 5.1 | 0.12 | 0.5 | Bal. |
| Hypereutectic alloy T 70 CNVF = 70% | 4.7 | 32.1 | 0.5 | 2.4 | 0.6 | 0.7 | 5.9 | 0.68 | 0.6 | Bal. |

Two commercial castings, i.e., slurry pump parts: Suction Liner 20 X18 HDMD 46, were cast from each of the above three alloy compositions. Each casting weighed 3500 lbs.

In particular, the eutectic alloy CM22 was controlled at 2780° F. and, after a melt had formed, Fe—V80% was added. The melt (9000 lbs.) was then cooled to 2600° F. and was cast into two sand molds.

The hypereutectic alloy T60 was controlled at 2780° F. and, after a melt had formed, Fe—V80% was added. The melt (9000 lbs.) was then nitrided by addition of Fe—Mn-7% N and thereafter cooled to 2650° F. and cast into two sand molds.

The hypereutectic alloy T70 was controlled at 2780° F. and a portion of vanadium was added. After a melt had formed, the alloy was nitrided by adding nitro-vanadium (71% V-18% N-9% C) and thereafter cooled to 2580° F. and cast into two sand molds.

Upon cooling the castings to ambient temperature, their hardness was tested before and after a hardening treatment. Further, after finish machining, each casting was assembled in a pump and was tested regarding its wear (abrasion) resistance with a well controlled flow of abrasion slurry for 1440 hours (see the photographs of the castings after the test in FIG. 1). Thereafter each casting was weighed to determine its weight loss due to abrasion by the slurry. The obtained results were as follows:

| Alloy | Hardness, as cast (HB) | Hardness after Heat-Treatment at 1850° F./6 h | Cryogenic hardening (−200° F./2 h) | Weight Loss (%) |
|---|---|---|---|---|
| CM22 | 580 | 744 | | 36 |
| T60 | 650 | 700 | | 27 |
| T70 | 680 | | 713 | 18 |

Figure 2:
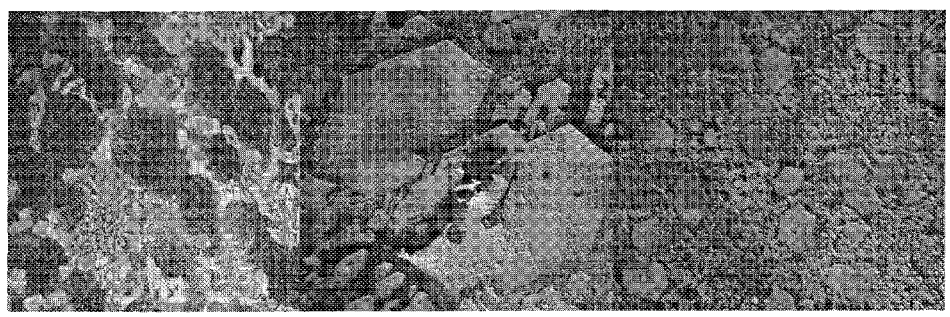
FIG. 2 shows photographs of the microstructure of the three alloys described in Example 3 below.

Further, the microstructure of the castings was evaluated (see photographs in FIG. 2). As can be seen from the photographs shown in FIGS. 1 and 2, with increasing percentage of CVF or CNVF the microstructure of the castings becomes more refined and the wear resistance increases.

It is noted that the foregoing examples have been provided merely for the purpose of explanation and is in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A hypereutectic white iron alloy, wherein the alloy comprises, in weight percent based on a total weight of the alloy:

| | |
|---|---|
| C | from 4.2 to 6.5 |
| N | from 0.04 to 1.2 |
| Cr | from 31 to 44 |
| Mn | from 0 to 8 |
| Ni | from 0 to 5 |
| Co | from 0 to 5 |
| Cu | from 0 to 5 |
| Mo | from 0 to 5 |
| W | from 0 to 6 |
| V | from 0 to 12 |
| Nb | from 0 to 6 |
| Ti | from 0 to 5 |
| (Mg + Ca) | from 0 to 0.2 |
| Si | from 0 to 3 |
| one or more rare earth elements | from 0 to 3 |
| one or more of Ta, Zr, Hf, Al, B | from 0 to 3 | remainder Fe and unavoidable impurities, provided that a carbonitride volume fraction (CNVF):
(% C+% N)×12.33+(% Cr+% M)×0.55−15.2 equals at least 50, % M representing a total percentage of V, Mo, Nb, and Ti.

2. The alloy of claim 1, wherein the alloy comprises from 4.3% to 6.5% by weight of C.

3. The alloy of claim 2, wherein the alloy comprises from 0.6% to 1% by weight of N.

4. The alloy of claim 1, wherein the alloy comprises from 4.4% to 6.5% by weight of C.

5. The alloy of claim 1, wherein the alloy comprises from 0.5% to 1.2% by weight of N.

6. The alloy of claim 1, wherein the alloy comprises from 2% to 12% by weight of vanadium.

7. The alloy of claim 6, wherein the alloy comprises from 0.05% to 2% of boron.

8. The alloy of claim 7, wherein CNVF equals at least 60.

9. The alloy of claim 6, wherein CNVF equals at least 60.

10. The alloy of claim 6, wherein the alloy comprises from 3% to 12% of vanadium.

11. The alloy of claim 6, wherein the alloy comprises from 4% to 12% of vanadium.

12. The alloy of claim 6, wherein the alloy comprises from 4.5% to 12% of vanadium.

13. The alloy of claim 1, wherein the alloy comprises from 0.05% to 2% of boron.

14. The alloy of claim 13, wherein the alloy comprises from 0.08% to 2% of boron.

15. The alloy of claim 1, wherein CNVF equals at least 60.

16. The alloy of claim 1, wherein the alloy is present in the form of a cast article.

17. The alloy of claim 1, wherein the alloy comprises at least 40% by weight of iron.

18. The alloy of claim 1, wherein the alloy comprises at least 50% by weight of iron.

19. The alloy of claim 1, wherein the alloy comprises (from 1.1 to 1.5)×(% C+% N) of vanadium.

20. The alloy of claim 1, wherein the alloy comprises (from 1.1 to 1.3)×(% C +% N) of vanadium.

21. The alloy of claim 1, wherein the alloy comprises from 0.01% to 0.8% of aluminum.

22. The alloy of claim 1, wherein the alloy comprises from 0.01% to 1.5% of titanium.

23. The alloy of claim 1, wherein the alloy comprises from 0.1% to 5% of copper.

24. The alloy of claim 1, wherein the alloy comprises at least one of molybdenum and tungsten in a combined weight percentage of at least 0.3%.

25. The alloy of claim 1, wherein the alloy comprises from 0.1% to 6% of niobium.

\* \* \* \* \*